United States Patent [19]

Matsuzawa et al.

[11] Patent Number: 5,141,789

[45] Date of Patent: Aug. 25, 1992

[54] SELF-ADHESIVE SHEET

[75] Inventors: Shigeji Matsuzawa, Itami; Hideaki Suzuki, Kitakatsuragi; Shuichiro Takeda, Kobe, all of Japan

[73] Assignee: Kanzaki Paper Manufacturing Co., Ltd., Tokyo, Japan

[21] Appl. No.: 546,684

[22] Filed: Jun. 29, 1990

Related U.S. Application Data

[63] Continuation of Ser. No. 284,115, Dec. 14, 1988, abandoned.

Foreign Application Priority Data

Dec. 16, 1987 [JP] Japan ............... 62-319297
Jan. 30, 1988 [JP] Japan ............... 63-20219

[51] Int. Cl.$^5$ .................................. C09J 7/02
[52] U.S. Cl. .................................. 428/40; 428/219; 428/342; 428/350; 428/354; 428/355
[58] Field of Search ............ 428/342, 343, 354, 40, 428/356, 219, 355, 350

[56] References Cited

U.S. PATENT DOCUMENTS

| | | | |
|---|---|---|---|
| 1,322,257 | 11/1919 | Miller | 428/354 |
| 2,328,057 | 8/1943 | Coulter | 428/355 |
| 2,721,810 | 10/1955 | Schram | 428/354 |
| 3,627,559 | 12/1971 | Chen | 428/343 |
| 3,810,783 | 5/1974 | Bomball | 428/356 |
| 4,056,661 | 11/1977 | Sato | 428/354 |
| 4,895,747 | 1/1990 | Birkholz | 428/354 |

Primary Examiner—Jenna L. Davis
Attorney, Agent, or Firm—Wenderoth, Lind & Ponack

[57] ABSTRACT

Provided herein is an improved self-adhesive sheet composed of a base member having a water-soluble polymer layer on its reverse side and a release member, with a pressure sensitive adhesive layer interposed between them, in which the bond strength between the water-soluble polymer layer and the pressure sensitive adhesive layer remains high. It can be stuck readily without moistening; and yet it can be peeled off easily simply by dipping in water.

16 Claims, 1 Drawing Sheet

SELF-ADHESIVE SHEET

This application is a continuation of now abandoned application, Ser. No. 07/284,115 filed on Dec. 14, 1988, now abandoned.

FIELD OF THE INVENTION

The present invention relates to a self-adhesive sheet which can be stuck without being moistened and yet can be removed readily without being deformed by moistening when necessary.

BACKGROUND OF THE INVENTION

Conventional postage stamps and revenue stamps (hereinafter referred to as "stamps" collectively) have on their reverse side an adhesive layer formed by coating a water-soluble polymer such as polyvinyl alcohol. The adhesive layer permits used stamps to be easily peeled off from envelopes, postcards, etc. by stamp collectors when dipped in water. However, this advantage is offset by a disadvantage that the adhesive layer has to be moistened when stamps are stuck to envelopes and postcards. Moistening needs water, but water is not always available, and water is often substituted by saliva. Licking stamps is unsanitary and indecent. In addition, moistening many stamps is a time-consuming work and incomplete moistening results in poor adhesion.

In order to eliminate the above-mentioned disadvantage, there was proposed a stamp of the self-adhesive paper type which can be stuck simply and efficiently. (See Japanese Utility Model Laid-open Nos. 77700/1977 and 108167/1981.) This stamp has a structure as shown in FIG. 1 and it comprises a release member 1, a pressure sensitive adhesive layer 2, a water-soluble polymer layer 3, and a stamp member 4. When the release member is removed, the stamp member is ready to be stuck. In actual practice, however, the stamp member of this structure was found to have a disadvantage that the stuck stamp member easily peels off even though it is not dipped in water, because there is not sufficient bond strength between the pressure sensitive adhesive layer 2 and the water-soluble polymer layer 3. Therefore, the stamp of this structure is not of practical use, unless this problem is solved.

On the other hand, conventional self-adhesive labels, seals, stickers, slips, etc., which do not have any water-soluble polymer layer as in the case shown in FIG. 1, can be stuck without the need of being moistened, and they do not peel off easily once they are stuck. Their disadvantage is that they cannot be easily peeled off by dipping in water when stamp collectors want to peel them off.

SUMMARY OF THE INVENTION

It is an object of the present invention to provide an improved self-adhesive sheet composed of a base member having a water-soluble polymer layer on its reverse side and a release member, with a pressure sensitive adhesive layer interposed between them, in which the adhesive strength between the water-soluble polymer layer and the pressure sensitive adhesive layer is high enough to keep the self-adhesive sheet stuck unless it is dipped in water.

Another object of the present invention is to provide an improved self-adhesive sheet of the above-mentioned structure which can be stuck readily in any environment.

To achieve the above-mentioned objects, the present inventors have carried out a series of researches and as a result, developed an improved self-adhesive sheet specified herein. The gist of the present invention resides in a self-adhesive sheet comprising a base member having a water-soluble polymer layer on its reverse side and a release member, with a pressure sensitive adhesive layer interposed between them, characterized in that said water-soluble polymer layer contains a selected pigment.

The self-adhesive sheet according to the present invention has a pressure sensitive adhesive layer which is formed from an acrylic emulsion whose principal component has a glass transition temperature which is lower than $-35°$ C. and is composed of monomers containing 0.2 to 4.0 wt % of ethylenic unsaturated carboxylic acid.

Figure 1:
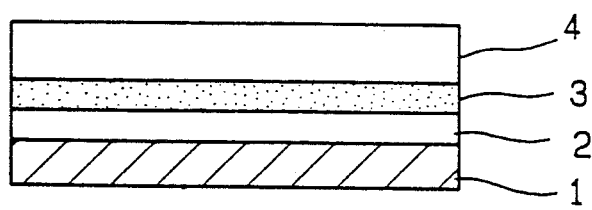
FIG. 1 is a schematic sectional view showing a conventional self-adhesive sheet for stamps.

In the figure, there are shown a release member 1, a pressure sensitive adhesive layer 2, a water-soluble polymer layer 3, and a stamp member 4.

DETAILED DESCRIPTION OF THE INVENTION

The present invention provides a self-adhesive sheet comprising a base member having a water-soluble polymer layer on its reverse side and a release member, with a pressure sensitive adhesive layer interposed between them, characterized in that said water-soluble polymer layer contains a selected pigment.

The water-soluble polymer that can be used in the present invention includes, for example, dextrin, starch, oxidized starch, carboxymethyl starch, dialdehyde starch, polyvinyl alcohol, polyvinyl methyl ether, polyvinyl pyrrolidone, casein, gum arabic, tragacanth gum, carboxymethyl cellulose, methyl cellulose, ethyl cellulose, hydroxyethyl cellulose, polyethylene oxide, sodium polyacrylate, and water-soluble acrylic resin. They may be used alone or in combination with one another.

According to the present invention, the water-soluble polymer layer is incorporated with a pigment. Examples of the pigment include kaolin, clay, talc, satin white, and lithopone, which are oxides, hydroxides, carbonates, sulfates, or silicates of magnesium, aluminum, calcium, barium, zinc, titanium, or silicon such as magnesium hydroxide, magnesium carbonate, magnesium sulfate, magnesium silicate, aluminum oxide, aluminum hydroxide, calcium oxide, calcium hydroxide, calcium carbonate, calcium sulfate, calcium silicate, barium oxide, barium carbonate, barium sulfate, zinc oxide, zinc carbonate, zinc sulfate, titanium oxide, and silicon oxide. They may be used alone or in combination with one another.

The amount of the pigment to be incorporated into the water-soluble polymer layer is preferably 3 to 95 wt %, more preferably 5 to 80 wt %, and most preferably 10 to 50 wt %, on the basis of the total solids in the water-soluble polymer layer. With an amount less than 3 wt %, the pigment does not provide sufficient adhesive strength between the water-soluble polymer layer and the pressure sensitive adhesive layer. With an amount in excess of 95 wt %, the pigment makes the self-adhesive sheet difficult to peel off by dipping in water.

The water-soluble polymer layer may also be incorporated with, in addition to the pigment, other adjuvants in an amount not harmful to the pigment and other components. Examples of the adjuvants include latices of styrene-butadiene copolymer, methyl methacrylate-butadiene copolymer, vinyl chloride polymer, vinylidene chloride polymer, acrylic polymer, vinyl acetate polymer, and ethylene-vinyl acetate copolymer.

The pigment-containing water-soluble polymer is applied to the reverse side of a base member for stamps. Coating may be accomplished in any manner using an air knife coater, roll coater, blade coater, or bar coater. The coating weight is preferably in the range of from 2 to 20 g/m$^2$ on dry basis. With a coating weight less than 2 g/m$^2$, the water-soluble polymer layer does not permit the stamp to peel off readily when dipped in water. With a coating weight in excess of 20 g/m$^2$, the water-soluble polymer layer does not produce any additional effect.

In the meantime, no elucidation has been made yet as to the reason why the adhesive strength rapidly increases between the water-soluble polymer layer and the pressure sensitive adhesive layer when the former is incorporated with a pigment. It is presumed that the pigment improves anchorage between the two layers. It is also presumed that the pigment provides metal ions which contribute to the electrical bond. The pigment provides an additional effect of preventing blocking when the base member is wound after the coating of a water-soluble polymer, especially dextrin.

After the coating of a water-soluble polymer layer, the base member for stamps is bonded to a release member, with a pressure sensitive adhesive layer interposed between them. This bonding is usually accomplished by placing the base member, which has been coated with a water-soluble polymer layer containing a pigment, on a release member which has been coated with a pressure sensitive adhesive, with the water-soluble polymer layer and the pressure sensitive adhesive layer facing each other. Alternatively, it is also possible to apply a pressure sensitive adhesive onto the water-soluble polymer layer and then place a release member on the pressure sensitive adhesive layer. The former method is preferable from the viewpoints of drying, curling, and moisture control.

The pressure sensitive adhesive that can be used may be selected from commonly used ones. Examples are acrylic pressure sensitive adhesives of emulsion type, solvent type, hot-melt type, and radiation-curable type; rubber pressure sensitive adhesives of emulsion type, solvent type, hot-melt type, and radiation-curable type; and other solvent-type pressure sensitive adhesives based on silicone, urethane, or vinyl ether.

The object of the present invention is achieved by incorporating a pigment into the water-soluble polymer layer on the reverse side of base paper for stamp, as mentioned above. This is not enough for stamps to stick stable in any environment. Some pressure sensitive adhesives are easily affected by heat, moisture, and light, and they still leave room for improvement.

For example, a solvent-type acrylic pressure sensitive adhesive (which usually contains a large amount of polar groups such as carboxyl group and hydroxyl group) decreases in adhesive strength when exposed to an environment of high humidity, because the carboxyl group or hydroxyl group react with the pigment contained in the base member for stamps or the water-soluble polymer layer. An isocyanate-curable solvent-type acrylic pressure sensitive adhesive becomes yellowed by light, leading to the degradation of stamps. A rubber-based pressure sensitive adhesive is vulnerable to degradation by light and liable to migrate to the base member for stamps when exposed to heat or after storage for a long time. In addition, a rubber-based pressure sensitive adhesive often causes trouble when the finished sheet is die-cut into smaller sheets by stamping.

To eliminate these disadvantages, the present inventors have carried out a series of researches on a pressure sensitive adhesive which permits stamps to stick stable in any environment. As a result, it has been found that the object of the present invention is achieved in the case where the pressure sensitive adhesive layer is formed from an acrylic emulsion whose principal component has a glass transition temperature which is lower than $-35°$ C. and is composed of monomers containing 0.2 to 4.0 wt % of ethylenic unsaturated carboxylic acid. This pressure sensitive adhesive slightly changes in physical properties even after storage for a long period of time at a high temperature under a high humidity. In addition, it exhibits a high adhesive strength even when used at low temperatures and does not cause problems of yellowing by light and migration of the pressure sensitive adhesive to the substrate. Moreover, the pressure sensitive adhesive as specified above permits the finished sheet to be die-cut easily into small pieces and is suitable for stamps to be used in varied environments.

According to the present invention, the emulsion-type acrylic pressure sensitive adhesive is limited to one whose principal component has a glass transition temperature which is lower than $-35°$ C., so that the pressure sensitive adhesive retains a sufficient adhesive strength even at low temperatures, say lower than 0° C. For the pressure sensitive adhesive to retain its adhesive strength even at a very low temperature, say lower than $-5°$ C., the glass transition temperature is preferably lower than $-45°$ C. According to the present invention, the emulsion-type acrylic pressure sensitive adhesive is limited to the one whose principal component is composed of monomers containing 0.2 to 4.0 wt % of ethylenic unsaturated carboxylic acid. If the content of ethylenic unsaturated carboxylic acid is higher than 4.0 wt %, the carboxyl groups or hydroxyl groups in the pressure sensitive adhesive react with the pigment contained in the substrate or the water-soluble polymer layer, decreasing the adhesive strength in an environment of high humidity. Therefore, the content of ethylenic unsaturated carboxylic acid is preferably less than 4 wt % or most preferably, less than 2.0 wt %. With a content less than 0.2 wt %, the pressure sensitive adhesive does not produce a sufficient adhesive strength and the emulsion has a poor stability.

Examples of the unsaturated ethylenic carboxylic acid monomer include acrylic acid, methacrylic acid, itaconic acid, maleic acid, fumaric acid, 2-methacryloyloxysuccinic acid, 2-methacryloyloxyethylmaleic acid, 2-methacryloyloxyethylphthalic acid, and 2-methacryloyloxyethylhexahydrophthalic acid.

The above-mentioned ethylenic unsaturated carboxylic acid is copolymerized with the following monomer to form the emulsion-type acrylic pressure sensitive adhesive: vinyl monomer having an alkyl group such as methyl (meth)acrylate, ethyl (meth)acrylate, isopropyl (meth)-acrylate, lauryl (meth)acrylate, stearyl (meth)acrylate, butyl (meth)acrylate, hexyl (meth)acrylate, cyclohexyl (meth)acrylate, 2-ethylhexyl (meth)acrylate, isoamyl (meth)acrylate, isooctyl (meth)acrylate, n-octyl (meth)-acrylate, dodecyl (meth)acrylate, and isobutyl (meth)-acrylate: vinyl monomer having a hydroxyl group such as 2-hydroxyethyl (meth)acrylate, 2-hydroxypropyl (meth)acrylate, 2-hydroxybutyl (meth)acrylate, and 3-chloro-2-hydroxy (meth)acrylate: vinyl monomer having an epoxy group such as diglycidyl (meth)acrylate and methylglycidyl (meth)acrylate: vinyl monomer having an alkoxy group such as methoxyethyl (meth)acrylate, ethoxyethyl (meth)acrylate, butoxyethyl (meth)acrylate, and phenoxyethyl (meth)acrylate: vinyl monomer having an ethylene oxide group such as diethylene glycol (meth)acrylate, methoxydiethylene glycol (meth)acrylate, methoxypolyethylene glycol (meth)acrylate, phenoxydiethylene glycol (meth)acrylate, and phenoxypolyethylene glycol (meth)acrylate: vinyl monomer having an amino group such as dimethylaminoethyl (meth)acrylate, diethylaminoethyl (meth)-acrylate, N-tert-butylaminoethyl (meth)acrylate, and methacryloyloxyethyltrimethyl ammonium chloride (meth)acrylate: vinyl monomer having an amide group such as (meth)acrylamide, N-methylol (meth)acrylamide, N-methoxymethyl (meth)acrylamide, N-butoxymethyl (meth)acrylamide, and N,N'-methylenebis(meth)acrylamide: vinyl monomer having halogen atoms such as trifluoroethyl (meth)acrylate, pentadecafluorooctyl (meth)acrylate, 2-chloroethyl (meth)acrylate, 2,3-dibromopropyl (meth)acrylate, and tribromophenyl (meth)acrylate: vinyl monomer having a phosphate group such as 2-methacryloyloxyethyldiphenyl phosphate (meth)acrylate, trimethacryloyloxyethylphosphate, and triacryloyloxymethy phosphate: vinyl monomer having a sulfonate group such as sodium sulfopropyl (meth)acrylate, sodium 2-sulfoethyl (meth)-acrylate, sodium vinylsulfonate, sodium styrenesulfonate, sodium 2-acrylamide-2-methylpropanesulfonate, and sodium 3-allyloxy-2-hydroxypropanesulfonate: vinyl monomer having a silane group such as vinyltrimethoxysilane, vinyltriethoxysilane, vinyltris($\beta$-methoxyethoxy)silane, vinyltriacetoxysilane, and methacryloyloxypropyltrimethoxy silane: vinyl monomer having a urethane group such as urethane (meth)acrylate: vinyl monomer having a phenyl group such as phenyl (meth)acrylate, p-tert-butylphenyl (meth)acrylate, and o-biphenyl (meth)acrylate: vinyl monomer having a benzyl group such as benzyl (meth)acrylate: and vinyl monomer having a tetrahydrofuryl group such as tetrahydrofuryl (meth)acrylate.

Examples of the copolymerizable monomer include styrene, chlorostyrene, α-methylstyrene, vinyltoluene, vinyl chloride, vinyl acetate, vinyl propionate, veoval 10, acrylonitrile, and vinyl pyridine The emulsion-type pressure sensitive adhesive used in the present invention can be produced by copolymerizing the above-mentioned monomers. A preferred one is produced by copolymerizing preferably 0.2 to 4.0 wt %. more preferably 0.2 to 2.0 wt % of ethylenic unsaturated carboxylic acid monomer, 55 to 95 wt % of vinyl monomer having an alkyl group with a carbon number of 4 or above, 4.8 to 44.8 wt % of vinyl monomer having an alkyl group with a carbon number below 3, and 0 to 20 wt % of other monomers.

The release member as a component of the self-adhesive sheet of the present invention is produced by coating or impregnating a substrate with a release agent such as silicon compound or fluorine compound. The substrate is glassine paper, clay-coated paper or craft paper, or wood-free paper coated or laminated with polyethylene for barrier coating.

The base member for stamps may be a member selected from the group consisting of wood-free paper, wood pulp paper, art paper, coated paper, cast-coated paper, metallized paper, synthetic paper, and film.

The self-adhesive sheet of the above-mentioned structure undergoes the printing of varied patterns required for stamps. However, it has printability affected by the water-soluble polymer layer, pressure sensitive adhesive layer, and release paper. Especially, in the case of gravure printing commonly used for stamps, printability depends on the smoothness, ink absorption, and cushioning of printing sheet. Desirable printability is obtained when printing sheet is provided with a coating layer composed mainly of a pigment and an adhesive. A preferred pigment is a combination of satin white and calcium carbonate having a surface area of 12,000 to 50,000 $cm^2/g$, and a preferred adhesive is a latex of alkali-sensitive polymer. This coating layer provides a printing surface having adequate bulkiness, smoothness, and ink absorption.

DESCRIPTION OF THE PREFERRED EMBODIMENTS

The invention will be described in more detail with reference to the following examples, which are not intended to restrict the scope of the invention. In examples, quantities are expressed in parts by weight, unless otherwise indicated.

EXAMPLE 1

The base paper for stamps was prepared by coating the reverse side of art paper (*) with a coating of water-soluble polymer of the following composition using an air knife coater. The coating weight was 7 $g/m^2$ on dry basis.

Polyvinyl alcohol . . . 50 parts
("PVA-105" made by Kuraray Co., Ltd.)
Calcium carbonate . . . 10 parts
("PZ" made by Shiraishi Calcium Co., Ltd.)
Water . . . 540 parts
* "Super Art Kinfuji 80 $g/m^2$" made by Kanzaki Paper Mfg. Co., Ltd.

On the other hand, the layer of pressure sensitive adhesive was formed by coating commercial polyethylene-laminated release paper with an emulsion-type acrylic pressure sensitive adhesive(*) using a reverse roll coater. The coating weight was 25 $g/m^2$ on dry basis.
* "Saibinol AT-94A" made by Saiden Kagaku Co., Ltd.

The base paper coated with a water-soluble polymer and the release paper coated with a pressure sensitive adhesive were bonded to each other to form the self-adhesive sheet. The sheet was aged for 20 hours.

Very strong bonding was achieved between the two layers of water-soluble polymer and pressure sensitive adhesive. When a specimen, with the release paper removed, was stuck to a stainless steel plate and peeled off 1 hour later, the two layers did not separate from each other but the layer of pressure sensitive adhesive separated from the stainless steel plate.

The thus prepared self-adhesive sheet was found to have good water removability. When a specimen, with the release paper removed, was stuck to an envelope and dipped in water for 10 minutes, the base paper was easily peeled off from the envelope owing to separation between the two layers of water-soluble polymer and pressure sensitive adhesive.

EXAMPLE 2

The same procedure as in Example 1 was repeated except that the base paper for stamps was prepared by coating the reverse side of cast-coated paper(*) with a coating of water-soluble polymer of the following composition using an air knife coater. The coating weight was 7g/m² on dry basis.

Dextrin . . . 50 parts
("Cream dextrin #15" made by Matsutani Kagaku Co., Ltd.)
Kaolin . . . 20 parts
Water . . . 280 parts
* "Mirror-coat Gold 84.7 g/m²" made by Kanzaki Paper Mfg. Co., Ltd.

The resulting self-adhesive sheet was tested for adhesive strength between the layers of water-soluble polymer and pressure sensitive adhesive and also for water-removability in the same manner as in Example 1. The results are shown in Table 1.

EXAMPLE 3

The same procedure as in Example 1 was repeated except that the base paper for stamps was prepared by coating the reverse side of wood-free paper with a coating of water-soluble polymer of the following composition using an air knife coater. The coating weight was 7 g/m² on dry basis.

Polyvinyl alcohol . . . 50 parts
("PVA-105" made by Kuraray Co., Ltd.)
Oxidized starch . . . 20 parts
("Amicoat #10" made by Matsutani Kagaku Co., Ltd.)
Styrene-butadiene copolymer latex . . . 10 parts
("Nipol L×204" made by Nippon Zeon Co., Ltd.)
Magnesium carbonate . . . 20 parts
Water . . . 900 parts The resulting self-adhesive sheet was tested for adhesive strength between the layers of water-soluble polymer and pressure sensitive adhesive and also for water-removability in the same manner as in Example 1. The results are shown in Table 1.

EXAMPLE 4

The base paper for stamps was prepared by coating the reverse side of art paper(*) with a coating of water-soluble polymer of the following composition using an air knife coater. The coating weight was 7 g/m² on dry basis.

Polyvinyl alcohol . . . 95 parts
("PVA 105" made by Kuraray Co., Ltd.)
Calcium carbonate . . . 15 parts
("PZ" made by Shiraishi Calcium Co., Ltd.)
Water . . . 1000 parts
* "Super Art Kinfuji 80 g/m²" made by Kanzaki Paper Mfg. Co., Ltd.

On the other hand, the layer of pressure sensitive adhesive was formed by coating commercial polyethylene-laminated release paper with a pressure sensitive adhesive(*) using a reverse roll coater. The coating weight was 25 g/m² on dry basis.
* Composed of 100 parts of solvent-type acrylic sticking agent "AT-D10H" made by Saiden Kagaku Co., Ltd. and 1 part of curing agent ("Curing Agent A" made by Saiden Kagaku Co., Ltd.)

The base paper coated with a water-soluble polymer and the release paper coated with a pressure sensitive adhesive were bonded to each other to form the self-adhesive sheet. The sheet was aged for 7 days.

The resulting self-adhesive sheet was tested for adhesive strength between the layers of water-soluble polymer and pressure sensitive adhesive and also for water-removability in the same manner as in Example 1. The results are shown in Table 1.

EXAMPLE 5

The base paper for stamps was prepared by coating the reverse side of art paper(*) with a coating of water-soluble polymer of the following composition using an air knife coater. The coating weight was 7 g/m² on dry basis.

Polyvinyl alcohol . . . 10 parts
("PVA-105" made by Kuraray Co., Ltd.)
Calcium carbonate . . . 90 parts
("PZ" made by Shiraishi Calcium Co., Ltd.)
Water . . . 500 parts
* "Super Art Kinfuji 80 g/m²" made by Kanzaki Paper Mfg. Co., Ltd.

On the other hand, the layer of pressure sensitive adhesive was formed by coating commercial polyethylene-laminated release paper with a rubber pressure sensitive adhesive(*) using a die coater. The coating weight was 25 g/m² on dry basis.
* "GM-21" made by Asahi Kagaku Gosei Co., Ltd.

The base paper coated with a water-soluble polymer and the release paper coated with a pressure sensitive adhesive were bonded to each other to form the self-adhesive sheet. The sheet was aged for 20 hours.

The resulting self-adhesive sheet was tested for adhesive strength between the layers of water-soluble polymer and pressure sensitive adhesive and also for water-removability in the same manner as in Example 1. The results are shown in Table 1.

COMPARATIVE EXAMPLE 1

The same procedure as in Example 1 was repeated except that the water-soluble polymer was not incorporated with calcium carbonate.

The resulting self-adhesive sheet was tested for adhesive strength between the layers of water-soluble polymer and pressure sensitive adhesive and also for water-removability in the same manner as in Example 1. The results are shown in Table 1.

COMPARATIVE EXAMPLE 2

The same procedure as in Example 2 was repeated except that the water-soluble polymer was not incorporated with kaolin.

The resulting self-adhesive sheet was tested for adhesive strength between the layers of water-soluble polymer and pressure sensitive adhesive and also for water-removability in the same manner as in Example 1.

COMPARATIVE EXAMPLE 3

The same procedure as in Example 3 was repeated except that the water-soluble polymer was not incorporated with magnesium carbonate.

The resulting self-adhesive sheet was tested for adhesive strength between the layers of water-soluble polymer and pressure sensitive adhesive and also for water-removability in the same manner as in Example 1. The results are shown in Table 1.

COMPARATIVE EXAMPLE 4

The same procedure as in Example 1 was repeated except that the base paper for stamps was prepared by coating the reverse side of wood-free paper with a coating of the following composition using an air knife coater. The coating weight was 7 g/m² on dry basis.

Styrene-butadiene copolymer latex . . . 80 parts
("Nipol Lx204" made by Nippon Zeon Co., Ltd.)

Magnesium carbonate ... 10 parts
Water ... 10 parts

The resulting self-adhesive sheet was tested for adhesive strength between the layers of water-soluble polymer and pressure sensitive adhesive and also for water-removability in the same manner as in Example 1. The results are shown in Table 1.

COMPARATIVE EXAMPLE 5

The same procedure as in Example 1 was repeated except that the coating of the following composition was used.

Polyvinyl alcohol ... 98 parts
("PVA-105" made by Kuraray Co., Ltd.)
Calcium carbonate ... 2 parts
("PZ" made by Shiraishi Calcium Co., Ltd.)
Water ... 1000 parts The resulting self-adhesive sheet was tested for adhesive strength between the layers of water-soluble polymer and pressure sensitive adhesive and also for water-removability in the same manner as in Example 1. The results are shown in Table 1.

COMPARATIVE EXAMPLE 6

The same procedure as in Example 1 was repeated except that the coating of the following composition was used.

Polyvinyl alcohol ... 4 parts
("PVA-105" made by Kruary Co., Ltd.)
Calcium carbonate ... 96 parts
("PZ" made by Shiraishi Calcium Co., Ltd.)
Water ... 300 parts The resulting self-adhesive sheet was tested for adhesive strength between the layers of water-soluble polymer and pressure sensitive adhesive and also for water-removability in the same manner as in Example 1. The results are shown in Table 1.

EXAMPLE 6

The base paper for stamps was prepared by coating the reverse side of art paper(*) with a water suspension of the following composition using an air knife coater. The coating weight was 7 g/m² on dry basis.

Polyvinyl alcohol ... 5 parts
("PVA-105" made by Kuraray Co., Ltd.)
Kaolin ... 2 parts

* "Super Art Kinfuji 80 g/m²" made by Kanzaki Paper Mfg. Co., Ltd.

On the other hand, the layer of pressure sensitive adhesive was formed by coating commercial polyethylene-laminated release paper with an emulsion-type acrylic pressure sensitive adhesive (having a glass transition temperature of −48° C.) formed by emulsion copolymerization of the following components. The coating weight was 25 g/m² on dry basis.

2-ethylhexyl acrylate ... 80 parts
Vinyl acetate ... 3 parts
methyl methacrylate ... 16 parts
acrylic acid ... 1 part
polyoxyethylene nonylphenol ether (surfactant) ... 1 part
sodium dioctylsulfosuccinate (surfactant) ... 1 part The base paper coated with a water-soluble polymer and the release paper coated with a pressure sensitive adhesive were bonded to each other to form the self-adhesive sheet.

The resulting self-adhesive sheet was tested for sticking property at low temperatures, light resistance, heat resistance, moisture resistance, and die-cut property. The results are shown in Table 2.

EXAMPLE 7

The same procedure as in Example 6 was repeated except that the emulsion-type acrylic pressure sensitive adhesive was replaced by the one (having a glass transition temperature of −37° C.) formed by emulsion copolymerization of the following components.

2-ethylhexyl acrylate ... 68 parts
vinyl acetate ... 11 parts
methyl methacrylate ... 18 parts
acrylic acid ... 3 parts
polyoxyethylene nonylphenol ether (surfactant) ... 1 part
sodium dioctylsulfosuccinate (surfactant) ... 1 part The resulting self-adhesive sheet was tested for sticking property at low temperatures, light resistance, heat resistance, moisture resistance, and die-cut property. The results are shown in Table 2.

COMPARATIVE EXAMPLE 7

The same procedure as in Example 6 was repeated except that the emulsion-type acrylic pressure sensitive adhesive was replaced by the one (having a glass transition temperature of −31° C.) formed by emulsion copolymerization of the following components.

2-ethylhexyl acrylate ... 63 parts
vinyl acetate ... 12 parts
methyl methacrylate ... 20 parts
acrylic acid ... 5 parts
polyoxyethylene nonylphenol ether (surfactant) ... 1 part
sodium dioctylsulfosuccinate (surfactant) ... 1 part The resulting self-adhesive sheet was tested for sticking property at low temperatures, light resistance, heat resistance, moisture resistance, and die-cut property. It was so poor in sticking property at low temperatures and moisture resistance that it was not suitable for use as stamps. The results are shown in Table 2.

COMPARATIVE EXAMPLE 8

The same procedure as in Example 6 was repeated except that the emulsion-type acrylic pressure sensitive adhesive was replaced by the one (having a glass transition temperature of −48° C.) formed by emulsion copolymerization of the following components.

2-ethylhexyl acrylate ... 80 parts
vinyl acetate ... 11 parts
methyl methacrylate ... 3 parts
acrylic acid ... 6 parts
polyoxyethylene nonylphenol ether (surfactant) ... 1 part
sodium dioctylsulfosuccinate (surfactant) ... 1 part The resulting self-adhesive sheet was tested for sticking property at low temperatures, light resistance, heat resistance, moisture resistance, and die-cut property. It was so poor in moisture resistance that it was not suitable for use as stamps. The results are shown in Table 2.

COMPARATIVE EXAMPLE 9

The same procedure as in Example 6 was repeated except that the emulsion-type acrylic pressure sensitive adhesive was replaced by the one (having a glass transition temperature of −31° C.) formed by emulsion copolymerization of the following components.

2-ethylhexyl acrylate ... 63 parts
vinyl acetate ... 12 parts methyl methacrylate ... 23 parts
acrylic acid ... 2 parts
polyoxyethylene nonylphenol ether (surfactant) ... 1 part
sodium dioctylsulfosuccinate (surfactant) ... 1 part The resulting self-adhesive sheet was tested for sticking property at low temperatures, light resistance, heat resistance, moisture resistance, and die-cut property. It was so poor in sticking property at low temperatures that it was not suitable for use as stamps. The results are shown in Table 2.

COMPARATIVE EXAMPLE 10

An attempt was made to prepare an emulsion-type acrylic pressure sensitive adhesive by emulsion copolymerization of the following components; but it was impossible to perform polymerization on account of coagulation which occurred in the initial stage of polymerization.

2-ethylhexyl acrylate ... 80 parts
vinyl acetate ... 3 parts
methyl methacrylate ... 16.9 parts
acrylic acid ... 0.1 parts
polyoxyethylene nonylphenol ether (surfactant) ... 1 part
sodium dioctylsulfosuccinate (surfactant) ... 1 part

COMPARATIVE EXAMPLE 11

The same procedure as in Example 6 was repeated except that the pressure sensitive adhesive was replaced by a solvent type acrylic pressure sensitive adhesive ("PE-154" made by Nippon Carbide Co., Ltd.).

The resulting self-adhesive sheet was tested for sticking property at low temperatures, light resistance, heat resistance, moisture resistance, and die-cut property. It was so poor in moisture resistance that it was not suitable for use as stamps. The results are shown in Table 2.

COMPARATIVE EXAMPLE 12

The same procedure as in Example 6 was repeated except that the pressure sensitive adhesive was replaced by a solvent-type acrylic pressure sensitive adhesive composed of 100 parts of "AT-D10H" (made by Saiden Kagaku Co., Ltd.) and 1 part of "Curing Agent A" (made by Saiden Kagaku Co., Ltd.).

The resulting self-adhesive sheet was tested for sticking property at low temperatures, light resistance, heat resistance, moisture resistance, and die-cut property. It was so poor in light resistance and moisture resistance that it was not suitable for use as stamps. The results are shown in Table 2.

COMPARATIVE EXAMPLE 13

The same procedure as in Example 6 was repeated except that the pressure sensitive adhesive was replaced by a rubber-based pressure sensitive adhesive "GM-21" (made by Asahi Gosei Kagaku Co., Ltd.).

The resulting self-adhesive sheet was tested for sticking property at low temperatures, light resistance, heat resistance, moisture resistance, and die-cut property. It was so poor in light resistance, heat resistance, and die-cut property that it was not suitable for use as stamps. The results are shown in Table 2.

TABLE 1

|  | Adhesive strength | Water removability |
| --- | --- | --- |
| Example 1 | Good | Good |
| Example 2 | Good | Good |
| Example 3 | Good | Good |
| Example 4 | Good | Good |
| Example 5 | Good | Good |
| Comparative Example 1 | Poor | Good |
| Comparative Example 2 | Poor | Good |
| Comparative Example 3 | Poor | Good |
| Comparative Example 4 | Good | Poor |
| Comparative Example 5 | Poor | Good |
| Comparative Example 6 | Good | Poor |

TABLE 2

|  | Sticking at low temperature | Light resistance | Heat resistance | Moisture resistance | Die-cut property |
| --- | --- | --- | --- | --- | --- |
| Example 6 | Good | Good | Good | Good | Good |
| Example 7 | Fair | Good | Good | Fair | Good |
| Comparative Example 7 | Poor | Good | Good | Poor | Good |
| Comparative Example 8 | Good | Good | Good | Poor | Good |
| Comparative Example 9 | Poor | Good | Good | Good | Good |
| Comparative Example 11 | Fair | Good | Good | Poor | Good |
| Comparative Example 12 | Good | Poor | Good | Poor | Good |
| Comparative Example 13 | Fair | Poor | Poor | Fair | Poor |

Note:
Sticking at low temperature - Sticking property at temperatures lower than 0° C.
Light resistance - Resistance of the pressure sensitive adhesive to yellowing which occurs with time upon exposure to light.
Heat resistance - Resistance of the pressure sensitive adhesive to migration to the base paper stamps which occurs at high temperatures.
Moisture resistance - Sticking property which is retained after standing in a high-humidity environment.
Die-cut property - Ability of the self-adhesive sheet to be die-cut into smaller size by stamping.

What is claimed is:

1. A self-adhesive sheet produced by (a) providing (i) a stamp member having a water-soluble polymer layer on its reverse side which layer is prepared by applying a coating composition comprising water-soluble polymer and at least one pigment in an amount of 5 to 80 wt % on the basis of the total solids in the water-soluble polymer layer onto the reverse face on the base member for stamps, and (ii) a release member having a pressure sensitive adhesive layer prepared by applying a coating composition comprising an emulsion-type acrylic pressure sensitive adhesive whose principal component has a glass transition temperature which is lower than −35° C. and is composed of monomers containing 0.2 to 4.0 wt % of ethylenic unsaturated carboxylic acid onto the surface of a release base member; (b) superposing said stamp member (i) through its water-soluble polymer layer onto the pressure sensitive adhesive layer of said release member (ii); and (c) subjecting the thus obtained laminate obtained to aging.

2. A self-adhesive sheet according to claim 1, wherein said stamp member contains postage stamps.

3. A self-adhesive sheet according to claim 1, wherein said water-soluble polymer layer has a coating weight of 2 to 20 g/m² on dry basis.

4. A self-adhesive sheet according to claim 3, wherein said stamp member contains postage stamps.

5. A self-adhesive sheet according to claim 1, wherein said pigment contained in said water-soluble polymer layer is a member selected from the group consisting of calcium carbonate, kaolin and magnesium carbonate.

6. A self-adhesive sheet according to claim 5, wherein said stamp member contains postage stamps.

7. A self-adhesive sheet according to claim 5, wherein said water-soluble polymer layer has a coating weight of 2 to 20 g/m² on dry basis.

8. A self-adhesive sheet according to claim 7, wherein said stamp member contains postage stamps.

9. A self-adhesive sheet produced by (a) providing (i) a stamp member having a water-soluble polymer layer on its reverse side which layer is prepared by applying a coating composition comprising water-soluble polymer and at least one pigment in an amount of 5 to 80 wt % on the basis of the total solids in the water-soluble polymer layer onto the reverse face of the base member for stamps, and (ii) a release member having a pressure sensitive adhesive layer prepared by applying a coating composition comprising an emulsion-type acrylic pressure sensitive adhesive whose principal component has a glass transition which is lower than $-35°$ C. and produced by copolymerizing 0.2 to 4.0 wt % of ethylenic unsaturated carboxylic acid monomer, 55 to 95 wt % of vinyl monomer having an alkyl group with a carbon number of 4 or more, 4.8 to 44.8 wt % of vinyl monomer having an alkyl group with a carbon number of below 3, and 0 to 20 wt % of other monomers onto the surface of a release base member; (b) superposing said stamp member (i) through its water-soluble polymer layer onto the pressure sensitive adhesive layer of said release member (ii); and (c) subjecting the thus obtained laminate obtained to aging.

10. A self-adhesive sheet according to claim 9, wherein said stamp member contains postage stamps.

11. A self-adhesive sheet according to claim 9, wherein said water-soluble polymer layer has a coating weight of 2 to 20 g/m² on dry basis.

12. A self-adhesive sheet according to claim 11, wherein said stamp member contains postage stamps.

13. A self-adhesive sheet according to claim 9, wherein said pigment contained in said water-soluble polymer layer is a member selected from the group consisting of calcium carbonate, kaolin and magnesium carbonate.

14. A self-adhesive sheet according to claim 13, wherein said stamp member contains postage stamps.

15. A self-adhesive sheet according to claim 13, wherein said water-soluble polymer layer has a coating weight of 2 to 20 g/m² on dry basis.

16. A self-adhesive sheet according to claim 15, wherein said stamp member contains postage stamp.

* * * * *